United States Patent [19]

Frind et al.

[11] Patent Number: 4,902,870
[45] Date of Patent: Feb. 20, 1990

[54] APPARATUS AND METHOD FOR TRANSFER ARC CLEANING OF A SUBSTRATE IN AN RF PLASMA SYSTEM

[75] Inventors: Gerhard Frind, Altamont; Paul A. Siemers, Clifton Park; Stephen F. Rutkowski, Duanesburg, all of N.Y.

[73] Assignee: General Electric Company, Schenectady, N.Y.

[21] Appl. No.: 330,854

[22] Filed: Mar. 31, 1989

[51] Int. Cl.[4] .............................................. B23K 9/00
[52] U.S. Cl. ........................... 219/121.52; 219/121.48; 219/121.47; 219/121.59; 427/34; 427/45.1; 118/50.1
[58] Field of Search ........... 219/121.48, 121.4, 121.43, 219/121.52, 121.47, 121.59; 315/111.21, 111.41; 427/34, 45.1, 46, 423; 118/621, 50.1

[56] References Cited

U.S. PATENT DOCUMENTS

| | | | |
|---|---|---|---|
| 3,839,618 | 10/1974 | Muehlberger | 219/121.47 |
| 3,961,103 | 6/1976 | Aisenberg | 427/34 |
| 4,039,416 | 8/1977 | White | 427/45.1 |
| 4,298,629 | 11/1981 | Nozaki et al. | 427/46 |
| 4,401,054 | 8/1983 | Matsuo et al. | 427/45.1 |
| 4,438,368 | 3/1984 | Abe et al. | 219/121.47 |
| 4,507,588 | 3/1985 | Asmussen et al. | 219/121.47 |
| 4,642,440 | 2/1987 | Schnackel et al. | 427/34 |
| 4,715,937 | 12/1987 | Moslehi et al. | 427/45.1 |
| 4,775,547 | 10/1988 | Siemers | 427/34 |
| 4,782,884 | 11/1988 | Siemers | 427/34 |
| 4,786,566 | 11/1988 | Siemers | 427/34 |
| 4,795,880 | 1/1989 | Hayes et al. | 219/121.52 |
| 4,805,833 | 2/1989 | Siemers | 427/45.1 |

Primary Examiner—M. H. Paschall
Attorney, Agent, or Firm—Paul R. Webb, II; James C. Davis, Jr.

[57] ABSTRACT

An RF plasma gun has a metal annular support ring at the gun's nozzle exit port. The ring is conductively mounted to a metal tank containing a substrate to be processed. The substrate is connected to a manipulator which is electrically isolated from the tank. A DC voltage is impressed between the tank, which contains an inert atmosphere at a pressure below that of ambient atmosphere, and the manipulator. The tank is placed at ground potential and the manipulator at a negative potential relative to the tank. The DC voltage creates an electric arc which flows from the exit port ring via the plasma to the substrate for cleaning the substrate.

12 Claims, 2 Drawing Sheets

APPARATUS AND METHOD FOR TRANSFER ARC CLEANING OF A SUBSTRATE IN AN RF PLASMA SYSTEM

BACKGROUND OF THE INVENTION

This invention relates generally to radio frequency (RF) plasma generating devices, and more particularly, to transfer arc cleaning of a substrate during plasma processing of the substrate.

Of interest is copending application entitled "Elimination of Strike-over in RF Plasma Guns" filed Nov. 7, 1988, Ser. No. 267,865 by G. Frind and assigned to the assignee of the present invention.

Radio frequency (RF) plasma deposition is a plasma spray process which is well known for producing high temperature gaseous plasma. The devices for generating the plasma are sometimes referred to as plasma guns. They find utility in diverse heating applications such as high temperature chemical reactions, heating of solid targets, melting of particles such as a superalloy and for providing surface coatings and spray processes. Plasma processes are also used to produce low interstitial content titanium, refractory metal, as well as the superalloy deposits. In addition, the deposition efficiency of materials sprayed by the RF plasma process can approach 100%.

One major problem with RF plasma processing has been the presence of oxides on the surface of the substrate to be plasma sprayed. Oxide free surfaces are necessary to obtain strong bonding between the spray deposit and the substrate, since many oxides can prevent the interdiffusion of the deposit in the substrate in a subsequent heat treatment. It is the interdiffusion which is required to form a good metallurgical bond.

One kind of plasma deposition system employs DC current. In DC plasma systems, a process referred to as transfer arc cleaning allows the removal of oxides on the substrate to be plasma sprayed. In FIG. 1, a prior art DC plasma deposition system employing transferred arc cleaning of a substrate is shown. The DC plasma gun includes a water cooled copper anode 10 including a powder inlet 12 in which the particles to be deposited are injected. A tungsten cathode 14 is positioned adjacent to the anode 10. A DC power supply 16 provides a DC voltage between the anode 10 and the cathode 14 with the anode 10 at a positive potential. A second DC voltage supply 18 is coupled between the anode 10 and the substrate 20 which receives the deposited material. The substrate 20 is at a negative potential relative to the anode 10.

Power supply 16 produces an arc 22 from the cathode 14 to the anode 10. This produces a plasma 24 which flows from the cavity 26 formed by the anode 10 to the substrate 20. The plasma plume 24 is created by gases flowing in the cavity 26 of the anode 10. Arcs produced by the power supply 18 are transferred from the anode 10 to the electrically conductive substrate 20 using the exited plasma plume 24 as one leg of the conduction path. This transferred arc cleans the surface of the substrate 20 removing surface oxides from the substrate by the action of multiple arcs moving across the surface of the substrate.

The problem with RF plasma guns is that they lack transferred arc cleaning capability. The reason for this is that unlike the DC plasma system of FIG. 1 in which the system employs anode and cathode electrodes to which a power supply can be conveniently connected for producing a transferred substrate cleaning arc, typical RF guns do not have comparable electrodes. In an RF plasma gun, the plasma is produced by induced RF energy which causes the flowing gases to create a plasma plume which flows to the adjacent substrate. The present inventors recognize a need for providing a transferred arc cleaning capability to typical RF plasma guns.

An RF plasma system for transfer arc cleaning of substrate during plasma processing of a substrate in accordance with one embodiment of the present invention includes an RF plasma device. The RF plasma device includes an enclosure defining a chamber for containing a plasma and having a plasma exit port through which the plasma flows. An electrical induction coil is adjacent to the enclosure for applying RF energy to a region within the chamber to create a plasma from the gas flowing in the chamber. The device includes an electrically conductive member at the exit port and secured to the enclosure. The member is sufficiently close to the contained plasma to form an electrically conductive path therewith. A substrate supports holds a substrate adjacent to the port for processing by the plasma. Means are included for providing a direct current voltage between the member and the substrate support. The voltage has a polarity so that an electrical arc flows from the member to the substrate in response to the voltage.

BRIEF DESCRIPTION OF THE DRAWINGS

FIG. 2 illustrates diagrammatically a typical arrangement of an RF plasma heating apparatus, such as an RF spray apparatus for providing a surface coating on a target. The apparatus comprises an RF generating device 30 secured to a plasma device support 32 which comprises, for example, a cylindrical metal well. The device 30 is secured to the support 32 centrally within the well. Support 32 is secured to a cylindrical metal tank 34 and projects somewhat into the interior of tank 34. The support 32 and the tank 34 are electrically conductively connected. The support 32 is an annular structure and is electrically conductively connected to the tank 34 throughout its annular region. The RF plasma device 30 is positioned at the bottom of the well of support 32 to inject a plasma 36 into the interior 38 of the tank 34. The plasma 36 passes into the tank through an opening 40 in the support 32. The tank is evacuated as is done in a conventional RF plasma system, e.g., to 250 torr.

Figure 1:
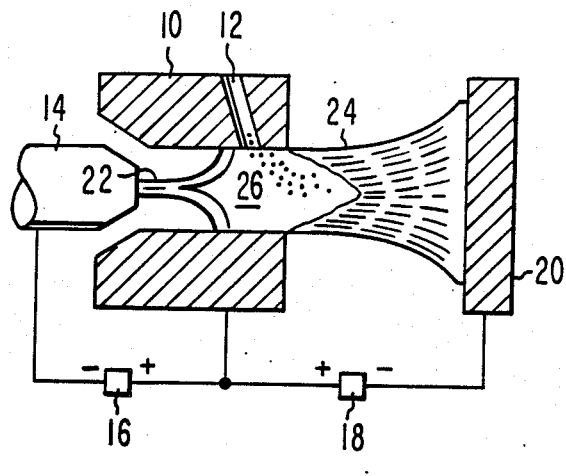
FIG. 1 is a somewhat diagrammatic sectional elevation view of a prior art DC plasma gun employing a transferred arc substrate cleaning system.

The plasma 36 heats or otherwise treats the surface of a target 42 within the tank interior 38. The target 42 is carried by a mechanical actuator sometimes referred to as a sting 44. The sting 44 enables the target 42 to be positioned and rotated relative to the plasma 36. In RF spray coating systems, particles of the coating material, such as a superalloy, are injected into the plasma stream, melted by the plasma and sprayed by the plasma onto the target to provide a surface coating on the target.

Typically, the target such as target 42, includes a substrate to which the plasma processing deposition is to be applied.

The sting 44 comprises a metal manipulator mechanism 46, only a portion of which is shown, for manipulating the target 42. The manipulator mechanism 46 typically in prior art systems may be electrically conductively coupled to the tank 34. In this embodiment, an insulator 48 electrically isolates the mechanism 46 from the tank 34. A sting support 50 located within tank 34 interior 38 also electrically isolates the sting mechanism 46 from the tank 34. A DC voltage source, for example, a battery 52 has its positive terminal connected to the tank 34 and its negative terminal connected to the sting 44 via a circuit breaker switch 54. The positive terminal of battery 52 is also connected to system ground.

Figure 3:
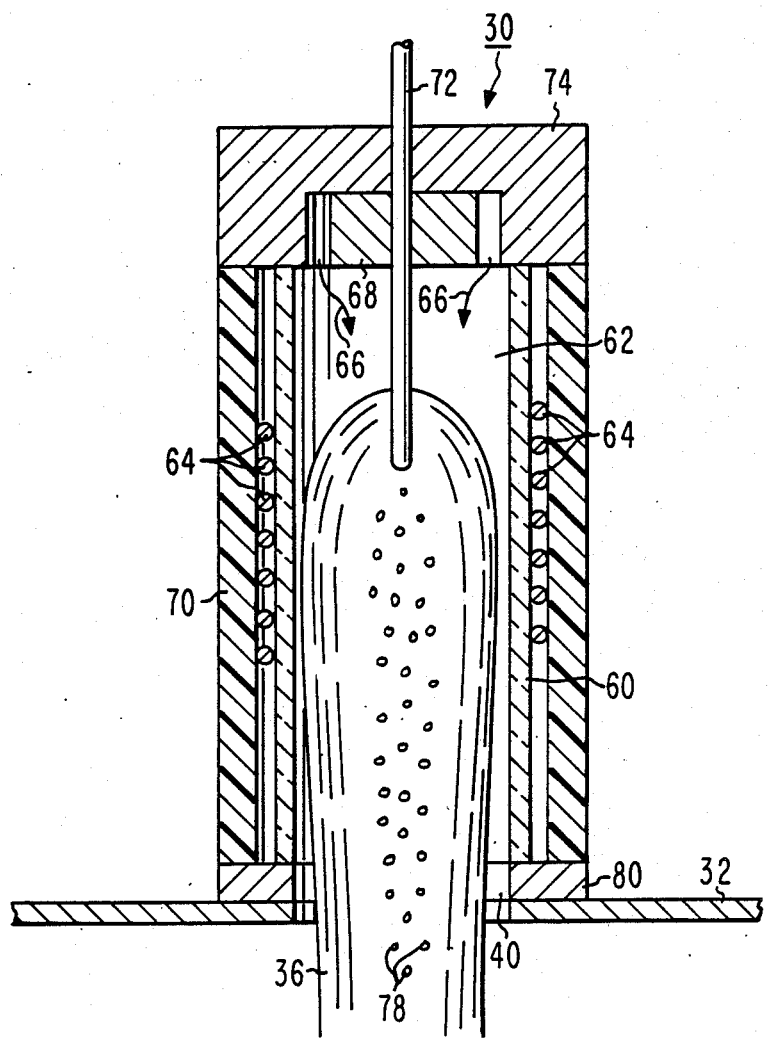
FIG. 3 is a more detailed sectional elevation view of the plasma gun of the embodiment of FIG. 2.

In FIG. 3, RF plasma device 30 comprises an electrically insulative dielectric enclosure 60, which typically may be made of quartz forming a cylindrical chamber 62 for the plasma. An electrical induction coil 64 is connected to a source of RF energy (not shown) and surrounds the enclosure 60 for coupling RF energy to an ionizable gas, such as argon which is injected into the chamber to produce the plasma. The argon flows in the direction of arrows 66. An annular ring 68 includes passageways (not shown) in which the ionizable gas mixture enters the plasma chamber 62. The gas streams illustrated by arrows 66 may be injected into the chamber 62 both axially and tangentially. A second tubular insulating member 70, which may be made of Teflon, is disposed about the coil 64 and enclosure 60. The coil 64, enclosure 60 and the second tubular insulating member 70 are concentric.

A water cooled particle injection tube 72 extends axially into the plasma chamber 62 through an end member 74 and the gas injection ring 68. The tubular enclosures 60 and 70 are secured to member 74.

Figure 2:
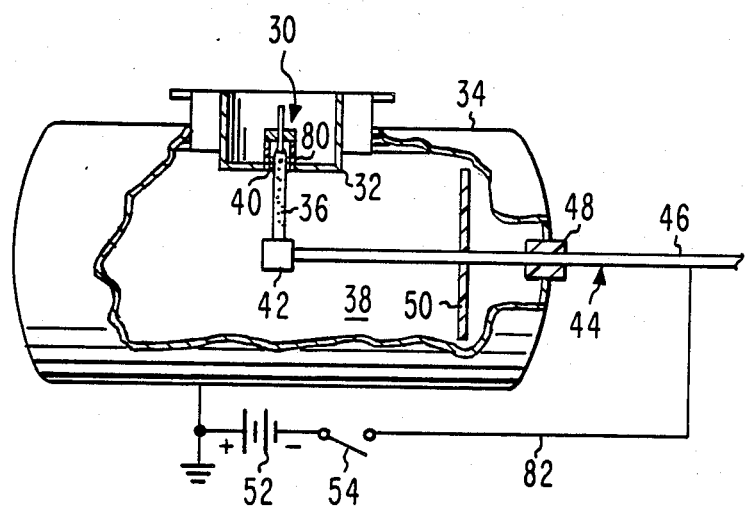
FIG. 2 is a fragmented side elevation sectional view of an apparatus employing an RF plasma gun in accordance with one embodiment of the present invention.

The particle injection tube 72 injects particles 78, for example a superalloy, into the plasma 36 so that the particles may be melted and sprayed upon the target 42 (FIG. 2) by the plasma. An annular ring 80 which is electrically conductive metal, is at the exit port of the plasma spray device 30 (adjacent to the lower portion of the drawing figure). The ring 80 structurally holds the various elements together including the enclosures 60 and 70 and the coil 64 and provides a mounting structure for the device 30. Not shown are cooling passageways located in various elements of the device 30 and means for supplying cooling water to the device.

The plasma device 30 as described is similar to a commercially available plasma gun manufactured by the TAFA Company. The device 30 does not normally include electrodes similar to a DC plasma gun described in connection with FIG. 1. The present inventors have discovered that the annular ring 80 normally used solely for structural purposes in the commercially available gun can be used as a DC electrode for transfer arc cleaning a substrate such as the target 42, FIG. 2. To this end, the ring 80 is electrically conductively connected and secured to the well support 32, FIG. 3. Normally, in prior art structures, the ring 80 is mounted electrically isolated from the well support 32 (and the tank 34, FIG. 2). However, by electrically connecting the ring 80 to the well support 32 and thus to the tank 34, the ring 80 and the well 32 may serve as a DC electrode for purposes of providing a transferred arc to the substrate for cleaning the substrate mounted on the target 42, FIG. 2.

Because the ring 80, FIG. 3, is electrically conductively coupled to the support 32 which in turn is electrically conductively coupled to the tank 34 which is at ground potential, the ring 80 is also at ground potential. The target 42 being coupled to the sting 44 mechanism 46 (FIG. 2) is at a negative DC potential relative to the ring 80.

In operation, the device 30 is preferably operated at a frequency of 250-450 kilohertz or at 1-10 megahertz. In operation at the higher frequency corona discharge and strikeovers are eliminated by the invention disclosed in the aforementioned copending application. Switch 54, which may be a conventional circuit breaker couples the DC voltage from battery 52, FIG. 2, to the sting 44 and tank 34 producing a negative potential at the sting. In one example, a set of six lead-acid cell automotive batteries are wired in series to obtain a relatively high current source with an open circuit voltage of nominally 72 volts. The batteries are wired in series with resistors (not shown) in a circuit breaker switch 54. An ammeter and voltmeter (not shown) may be included to measure voltage and current. For example, a wire 82 connects one terminal of switch 54 to sting 44. The other terminal of switch 54 is connected to the negative terminal of battery 52 whose positive terminal is connected to ground and to the tank 34. The voltmeter (not shown) may be coupled across the battery 52 and the ammeter placed in series in the wire 82. The series resistance (not shown) may be adjustable to set a maximum allowable current during the cleaning process. Circuit breaker 54 serves also as an on/off switch as well as providing high current protection to the circuitry.

Closing the switch 54 provides a DC voltage between the ring 80, FIG. 3, and the target 42. The ring 80 is sufficiently close to the plasma 36 plume in the nozzle exit port opening 40 to provide a DC arc from the ring 80 via the plume 36 to the substrate on target 42. Oxide removal was observed at the substrate on the target 42. The positive terminal of battery 52 preferably should not be directly connected to the ring 80 at a localized point. It is believed that the DC arc transfers from the ring 80 to the next adjacent plume 36 and thus to the target 42 performing the desired cleaning action on the substrate at the target. In one test, the plasma device 30 was operated at 60 kilowatts using only argon as the plasma gas. When the transferred arc cleaning circuit was operated at about 150 amperes of current, a vigorous cleaning action was observed on a steel substrate at target 42. It was observed that good cleaning could be obtained with currents as low as 50 amperes. When molecular gases are added to the plasma such molecular gases having higher thermal conductivities than argon, it was observed that the transferred arc cleaning current drops significantly from the level observed with argon alone. One such molecular gas, for example, may be hydrogen. Therefore, when a molecular gas such as hydrogen is employed in combination with argon, the higher thermal conductivity of the plasma gases normally may require increased voltage to initiate and sustain a transferred arc for cleaning the substrate. While a 72 volt battery 52 provides arc cleaning of a substrate using argon and hydrogen, voltages higher than 72 volts may be used to create greater arc cleaning power. For example, voltages in the range of 150 to 300 volts are preferable. The power supplies that are presently available for use with DC transferred arc cleaning systems may be used with RF guns. Therefore, currently available DC power supplies are useful for providing a transferred arc cleaning substrates in RF plasma guns regardless of the power level of the RF guns.

What is claimed is:

1. An RF plasma system for arc cleaning oxides from the surface of a substrate during RF plasma processing of the substrate comprising:
    an RF plasma device including a dielectric enclosure defining a chamber for containing a plasma and having a plasma exit port through which said plasma flows, an electrical conductor coil adjacent to the enclosure for applying RF energy to a region within the chamber to create a plasma from a gas flowing in the chamber and an electrically conductive member at said port and secured to said enclosure, said member being sufficiently close to said flowing plasma to permit current to flow to the plasma from the member;
    a substrate support for holding a substrate adjacent to said port for processing by the plasma flowing through the port; and
    means for providing a direct current (DC) voltage between said member and said substrate support, said voltage having a polarity and magnitude such that an electric arc flows from said member to said substrate via said plasma, said arc being of sufficient intensity to substantially remove said oxides from said substrate during said processing.

2. The system of claim 1 wherein said member is at a positive reference potential relative to said substrate.

3. The system of claim 1 wherein said member is at ground potential.

4. The system of claim 1 wherein said electrically conductive member is annular, said means for providing a voltage includes means for providing a negligible voltage drop across said annular member.

5. The system of claim 1 further including an electrically conductive gas confining tank defining a second chamber, said tank including means for positioning said support in the second chamber electrically isolated from the tank, said annular member being electrically conductively secured to said tank with said exit port in communication with said second chamber.

6. The system of claim 5 wherein said means for providing said voltage includes means for applying a positive potential to said tank and a negative potential to said support.

7. The system of claim 1 wherein said means for providing a voltage includes an electrically conductive plasma device support structure in electrically conductive contact with said member.

8. The system of claim 7 wherein said means for providing a voltage include means for applying a positive potential to said member so as to effectively produce a substantially uniform potential drop across said member when said arc is present.

9. An RF plasma system for arc cleaning oxides from a substrate surface during RF plasma processing of the substrate comprising:
    an electrically conductive housing forming a first chamber;
    means for positioning a substrate within the first chamber and electrically isolated from the housing;
    an RF plasma device comprising an RF coil surrounding a tubular dielectric member forming a second chamber, means for flowing a gas through the second chamber into the first chamber via an exit port of the second chamber, and an electrically conductive support electrically conductively secured to the housing at said exit port for supporting said coil and member so that RF energy is applied to said flowing gas in the second chamber to form a plasma which flows through said exit port; and
    means for placing said means for positioning at a negative DC potential relative to said housing and said support such that a DC arc flows from said electrically conductive support via said plasma to said positioned substrate, said arc being of sufficient intensity to substantially remove said oxides from said substrate.

10. The system of claim 9 including means for operating the RF device at about 250-400 KHz.

11. The system of claim 9 including means for operating the RF device at about 1-10 MHz.

12. The system of claim 9 wherein the first chamber is at a pressure below ambient atmospheric pressure.

* * * * *